(12) United States Patent
Khan et al.

(10) Patent No.: US 12,717,936 B2
(45) Date of Patent: Aug. 25, 2026

(54) SYSTEMS AND METHODS FOR SELECTIVE ACCESS CONTROL FOR PORTIONS OF A BLOCKCHAIN

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Joel Jimenez, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

(21) Appl. No.: 18/815,504

(22) Filed: Aug. 26, 2024

(65) Prior Publication Data

US 2026/0057081 A1 Feb. 26, 2026

(51) Int. Cl.
*G06F 21/60* (2013.01)
*G06F 21/62* (2013.01)

(52) U.S. Cl.
CPC ........ *G06F 21/602* (2013.01); *G06F 21/6218* (2013.01)

(58) Field of Classification Search
CPC ........................... G06F 21/602; G06F 21/6218
See application file for complete search history.

(56) References Cited

U.S. PATENT DOCUMENTS

2024/0005314 A1* 1/2024 Kumar ................. G06Q 10/087

OTHER PUBLICATIONS

"Hyperledger Fabric Docs", Retrieved from <https://hyperledger-fabric.readthedocs.io/en/release-2.5/> (Year: 2023).*

* cited by examiner

*Primary Examiner* — Sangseok Park

(57) ABSTRACT

A system described herein may maintain a blockchain that includes a plurality of records, where a particular record of the blockchain includes a set of access policies, and an access policy identifier. The system may receive a request to perform a set of operations, determine that the requested set of operations is associated with the access policy identifier, whether the request meets the set of access policies included in the particular record with which the access policy identifier is associated, and selectively perform or forgo performing the requested set of operations based on the determination of whether the request meets the set of access policies, including performing the requested set of operations when determining that the request meets the set of access policies, and forgoing performing the requested set of operations when determining that the request does not meet the set of access policies.

20 Claims, 12 Drawing Sheets

Key

Record accessible to access group 107-1

Record accessible to access group 107-2

Record accessible to access group 107-3

Shared record (accessible to access groups 107-2 and 107-3)

SYSTEMS AND METHODS FOR SELECTIVE ACCESS CONTROL FOR PORTIONS OF A BLOCKCHAIN

BACKGROUND

Blockchains provide for the decentralized and secure storage of data, decentralized computing, or other technical operations. Blockchains may further provide for the immutability of recorded data (e.g., as maintained by computing devices that implement nodes), as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

DETAILED DESCRIPTION OF EXAMPLE EMBODIMENTS

Figure 1:
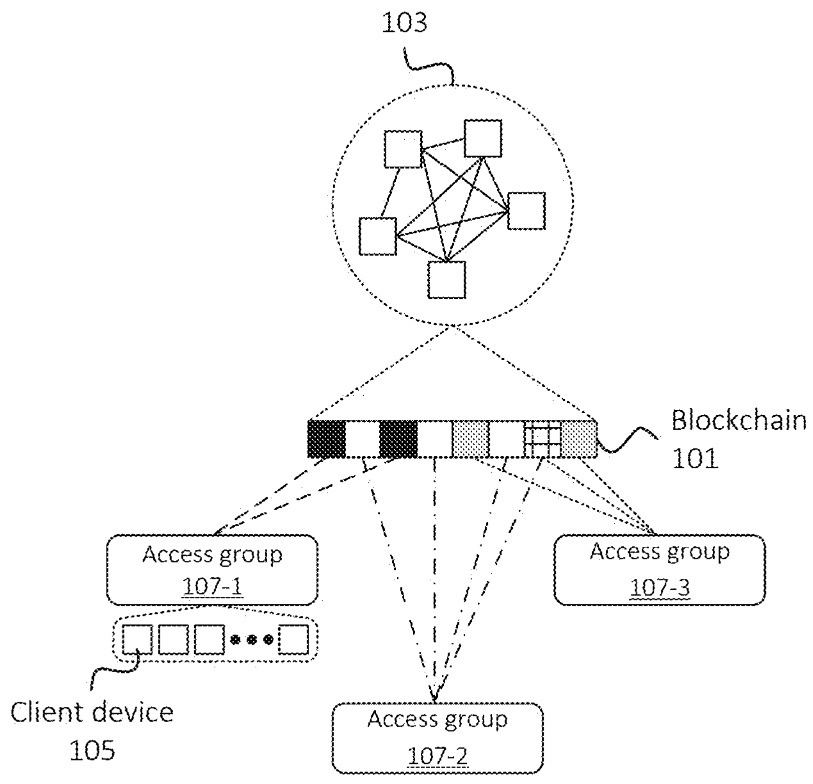
FIGS. 1 and 2 illustrate an example overview of one or more embodiments described herein.
Figure 1:
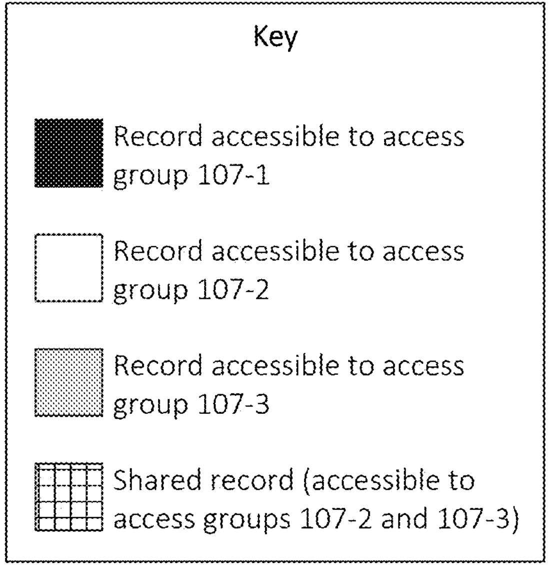

The following detailed description refers to the accompanying drawings. The same reference numbers in different drawings may identify the same or similar elements.

Organizations often provide network management services to multiple enterprise customers. Often, each of these customers desires a secure and isolated environment to manage their own network configurations, monitor network performance, and implement many other functionalities. Some of these configuration and performance monitoring and modification operations may occur through the use of blockchain technology. Data privacy policies may include the use of separate blockchains or channels for each customer, with repetitive deployment of separate sets of chaincode, in addition to access policies for each channel. This approach may lead to increased complexity, cost, and maintenance overhead as the number of customers increases. Additionally, cloud service providers may implement limits on the quantity of channels or blockchains that may be implemented. Furthermore, a consortium of Internet Service Providers ("ISPs") may collaborate to enhance the network monitoring and incident response capabilities through sharing insights while maintaining privacy of their proprietary network data. If implemented using blockchain technologies, separate channels for each ISP would significantly complicate the sharing of aggregated insights and significantly slow down the incident response processes due to the isolated nature of each channel.

Some of the above scenarios may use blockchains to implement the mechanisms due to the significant advantages they provide. Blockchains may be maintained by multiple nodes, such as geographically distributed or otherwise distinct servers, workstations, etc., that each maintain local copies of respective blockchains. A blockchain network may refer to a particular group of nodes that communicate with each other to maintain a particular blockchain. For example, the nodes may maintain local copies of the blockchain and changes to the blockchain may be subject to satisfying a consensus mechanism implemented by the blockchain network. The consensus mechanism may aid in avoiding unauthorized changes from being made to the blockchain, thus providing a measure of immutability to the blockchain.

Blockchains may be implemented as "permissioned" blockchains in which particular entities, such as client devices, are authorized to access such blockchains. For example, a client device authorized to access a permissioned blockchain may be authorized to perform blockchain operations such as reading blockchain data (e.g., accessing, obtaining, receiving, etc.) data that has been recorded to the blockchain, invoking chaincode with respect to the blockchain, recording data to the blockchain, and/or the like. As such, different blockchains or blockchain channels (e.g., in a channel-based blockchain framework such as the Hyperledger® Fabric) may be deployed in order to provide blockchain access to different groups of client devices.

As discussed above, and below in more detail, managing access to different blockchains may be burdensome in terms of coordinating the configuration of different groups of nodes to maintain different blockchains. Further, situations may arise in which the quantity of blockchains or channels is subject to a maximum limit, and implementing more blockchains than the limit may be unfeasible or impossible in the context of such limit. Additionally, situations may arise in which certain portions of the blockchain (e.g., certain records and/or operations) are accessible to different groups of client devices, and coordinating the synchronization of such shared portions of the blockchain may increase the complexity of implementing such blockchains.

Embodiments described herein provide for a simplified mechanism for managing access to portions of a blockchain, such that different groups of client devices may be authorized to access different portions (e.g., records) of the blockchain so that, for example, all chaincode can be deployed to a single channel accessible by all enterprise customers in a managed manner by applying access policies at the chaincode level. Further, such embodiments may provide the ability for ISPs to deploy their chaincode related to network monitoring and incident response on a single main channel, where the access control may be enforced using pre-transaction logic.

For example, as shown in FIG. 1, a particular blockchain 101 may be implemented by a group of nodes (e.g., blockchain network 103). The nodes may implement a set of application programming interfaces ("APIs"), software development kits ("SDKs"), a blockchain framework, etc. via which the nodes communicate with each other to maintain blockchain 101. For example, each node may maintain a respective local copy of blockchain 101, may maintain world state information derived from blockchain 101 (e.g., values, variables, etc. that are recorded to blockchain 101), may initiate or participate in consensus mechanisms to validate the addition of new information to blockchain 101, etc.

As shown, in accordance with some embodiments, blockchain 101 may include sets of records that are each accessible to different respective groups of client devices 105. For example, blockchain 101 may include a first set of records that are accessible to a first set of client devices 105 (referred to as a first access group 107-1), a second set of records that are accessible to a second set of client devices 105 (e.g., a second access group 107-2), and a third set of records that are accessible to a third set of client devices 105 (e.g., a third access group 107-3). In this example, blockchain 101 further includes a fourth set of records that are accessible to multiple access groups (referred to as "shared records," such as a shared record that is accessible to access groups 107-2 and 107-3 but not to access group 107-1). In example embodiments, access groups 107-1 through 107-3 may each correspond to an enterprise or an ISP, as described above, through which they can access particular respective functions related to data maintained on blockchain 101 (e.g., particular sets of chaincode or other operations), such that each other access group 107 cannot access such functions. In some embodiments, the operations may include requests for monitoring a network, network device configuration change information, data sharing requests or the like.

In the examples provided below, "access" to a given portion of blockchain 101 (e.g., one or more records of blockchain 101) is described in the context of invoking chaincode that is recorded to such portion of blockchain 101. For example, a given client device 105 of access group 107-1 may be authorized to invoke chaincode that is recorded to a record that is within the first set of records, but may not be authorized to invoke chaincode that is recorded to a record that is within the second, third, or fourth sets of records. In practice, similar concepts may apply to chaincode that is not itself recorded to blockchain 101. For example, chaincode may be implemented, provided, etc. as part of one or more APIs, SDKs, frameworks, etc. implemented by nodes of blockchain network 103, where such chaincode may itself not have been recorded to blockchain 101. For example, in such implementations, descriptions of chaincode that is accessible to a given client device 105 or to a given access group 107 may refer to chaincode, that is implemented by one or more nodes of blockchain network 103, that is authorized to be invoked by such client device 105 or access group 107.

Providing selective access to portions of a particular blockchain 101 (e.g., to particular chaincode that is authorized to be invoked by particular client devices 105 or access groups 107) may allow for differentiated access to blockchain operations, without the need to implement multiple blockchains that each have different access parameters (e.g., that allow for access to different access groups 107). Further, implementing blockchain 101 with the selective access parameters, in accordance with embodiments described herein, may allow for seamless (e.g., less complex) management and providing of shared records (e.g., records that are accessible to multiple access groups 107). For example, some records (e.g., shared records) of blockchain 101 may include data, variables, etc. that serve as inputs for chaincode for which access is selectively provided. Such records (e.g., that include data, variables, etc.) may be accessible to some or all access groups 107 or client devices 105, whereas chaincode that specifies operations to perform on such data, variables, etc. may only be accessible to certain access groups 107 or client devices 105 (e.g., fewer access groups 107 or client devices 105 than are authorized to access the shared records.

Figure 2:
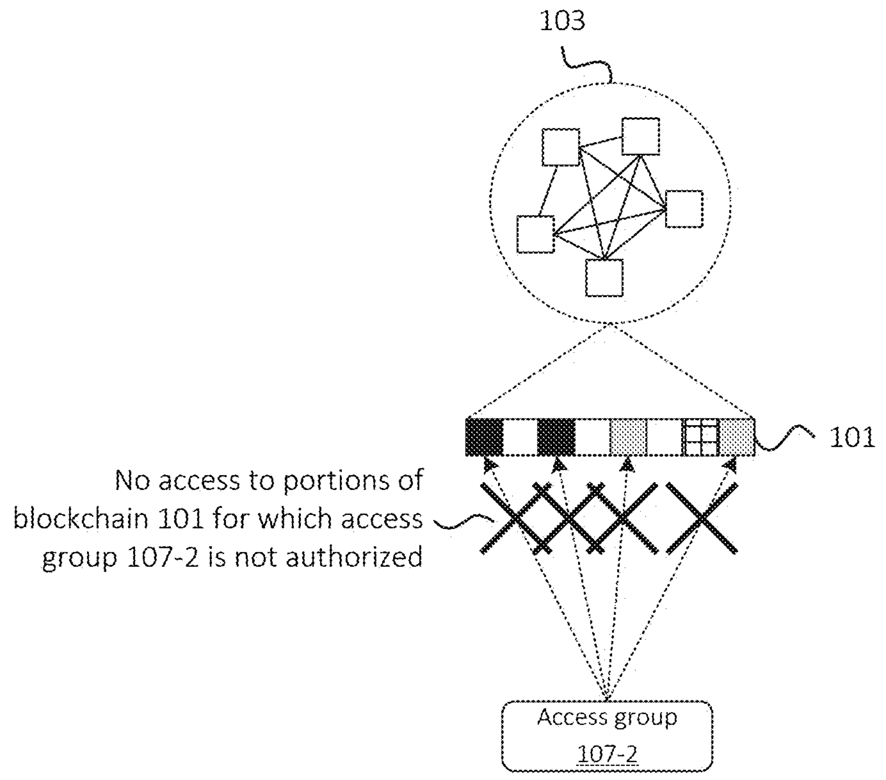

As shown in FIG. 2, providing selective access to certain portions of blockchain 101 may include restricting access to other portions of blockchain 101. For example, access group 107-2 (e.g., client devices 105 of access group 107-2) may not be able to access portions of blockchain 101 for which access group 107-2 has not been authorized. Similarly, access group 107-1 may not be able to access portions of blockchain 101 for which access group 107-1 has not been authorized, and access group 107-3 may not be able to access portions of blockchain 101 for which access group 107-3 has not been authorized.

Figure 3:
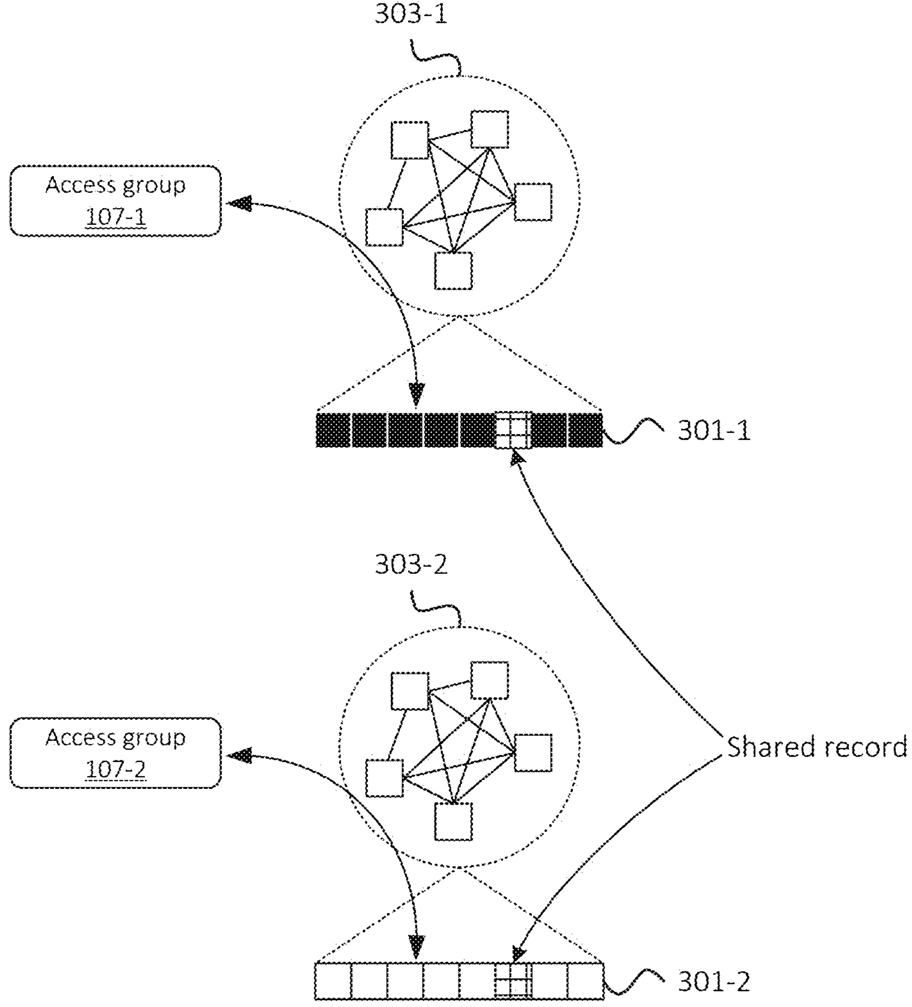
FIG. 3 illustrates an example of implementing multiple blockchains with one or more shared records.
Figure 3:
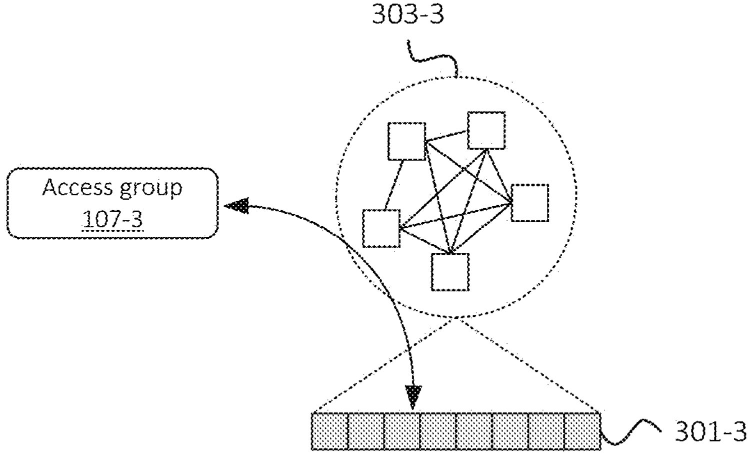

FIG. 3 illustrates an implementation that highlights some of the challenges of implementing multiple blockchains 101 (e.g., multiple channels in a channel-based blockchain framework) in order to selectively provide access to respective blockchain records. As shown, three example blockchains 301-1, 301-2, and 301-3 may be implemented by respective blockchain networks 303-1, 303-2, and 303-3. In some embodiments, blockchains 301-1, 301-2, and/or 301-3 (and/or corresponding blockchain networks 303-1, 303-2, and/or 303-3) may be implemented via separate channels in a channel-based blockchain framework. In this example, blockchain 301-1 may include records for which access group 107-1 is authorized to access, blockchain 301-2 may include records for which access group 107-2 is authorized to access, and blockchain 301-3 may include records for which access group 107-3 is authorized to access. By way of example, the records shown in FIG. 2 as being accessible by respective access groups 107 may be considered as corresponding to records shown in FIG. 1 as being accessible by the same respective access groups 107. For instance, blockchains 301-1 and 301-2 may both include the shared record that is accessible by both access groups 107-1 and 107-2.

As may be made apparent in this example, the shared record is required to be duplicated (e.g., maintained in both blockchain 301-1 and blockchain 301-2), which may increase the complexity of implementing blockchains 301-1 and 301-2. Such complexity may include, for example, synchronization of data between blockchains 301-1 and 301-2 (e.g., effecting the recordation of the shared record to two separate blockchains). Additionally, implementing the separate blockchains 301-1, 301-2, and 301-3 may be more resource-intensive, as multiple blockchain networks 303-1, 303-2, and 303-3 would need to be established, configured, maintained, etc. in order to implement the multiple blockchains 301-1, 301-2, and 301-3.

Figure 4:
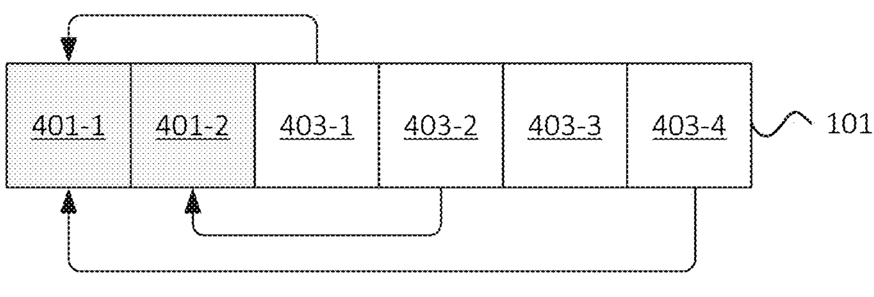
FIGS. 4-6 illustrate an example of using access control records to provide selective access to portions of a blockchain, in accordance with some embodiments.
Figure 4:
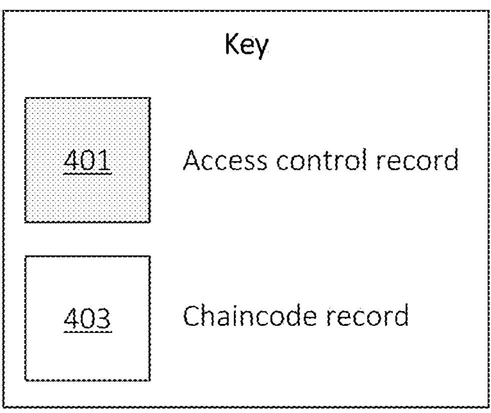

As shown in FIG. 4, blockchain 101 of some embodiments may include one or more access control records 401 (e.g., access control records 401-1 and 401-2, in the examples discussed herein). As discussed below, access control records 401 may include or indicate access policies that provide for the selective access of respective portions or operations with respect to blockchain 101. In this example, blockchain 101 also includes multiple chaincode records 403 (e.g., chaincode records 403-1, 403-2, 403-3, and 403-4). In accordance with some embodiments, one or more chaincode records 403 may invoke, inherit, identify, and/or otherwise indicate one or more respective access control records 401. For example, chaincode records 403-1 and 403-4 may indicate access control record 401-1, and chaincode record 403-2 may indicate access control record 401-2. Furthermore, chaincode record 403-3 may not indicate any access control record 401 (e.g., may not indicate access control record 401-1 and may also not indicate access control record 401-2).

In other words, access to chaincode records 403-1 and 403-4 (e.g., authorization to invoke operations specified in chaincode records 403-1 and 403-4) may be managed in accordance with access policies indicated by access control record 401-1, and access to chaincode record 403-2 may be managed in accordance with access policies indicated by access control record 401-2. Further, in this example, chaincode record 403-3 may be "open" or otherwise accessible to any entity (e.g., any client device 105) that is able to access blockchain 101. In other words, access to chaincode record 403-3 may not be restricted by any access policies, in this example.

As noted above, while these examples are provided in the context of respective chaincode being included in data recorded to blockchain 101 (e.g., in different chaincode records 403), similar concepts may apply to chaincode that is maintained "off-chain," such as chaincode that is included or implemented via one or more blockchain APIs, SDKs, frameworks, etc.

Figure 5:
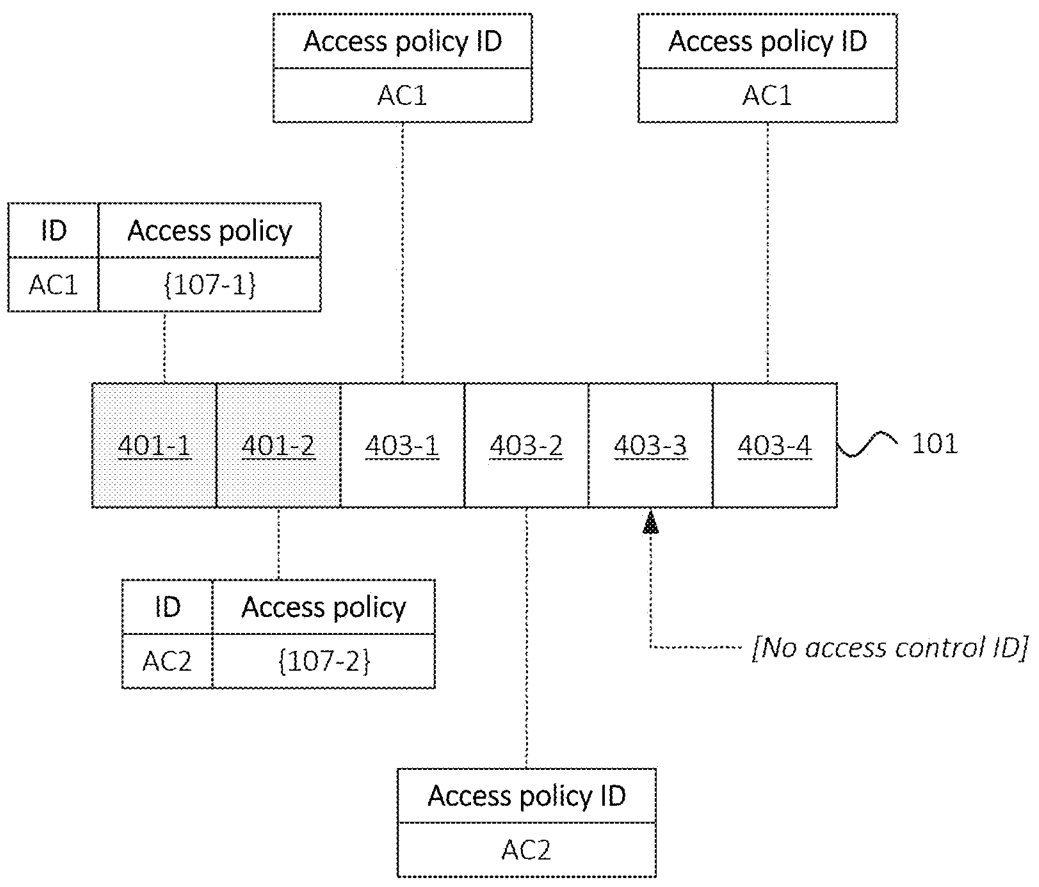

FIG. 5 illustrates an example arrangement of information, in accordance with some embodiments, that may be used to indicate selective access to certain records of blockchain 101. As shown, access control records 401-1 and 401-2 may each include a respective identifier as well as a respective access policy. The respective identifier for different access control records 401 may uniquely identify the access policies with which such access control records 401 are associated. Access control records 401 may be, for example, randomly generated numbers, pseudorandom numbers, cryptographic hashes, etc. As such, the identifier for access control record 401-1 (i.e., "AC1" in this example) may be different from the identifier for access control record 401-2 (i.e., "AC2" in this example), in order to differentiate between the corresponding access policies.

The access policy specified in access control record 401-1 may indicate that client devices 105 of access group 107-1 are authorized under such access policy. Access group 107-1 may, for example, be associated with particular enterprise customers, or individual ISPs. This access policy may include, for example, device identifiers of client devices 105 (e.g., Internet Protocol ("IP") addresses, International Mobile Station Equipment Identity ("IMEI") values, Mobile Directory Numbers ("MDNs"), or the like). Additionally, or alternatively, the access policy may specify addresses in an address space of blockchain 101, where different clients, "wallets," etc. are associated with different addresses and utilize cryptographic authentication mechanisms when invoking or requesting operations to be performed with respect to blockchain 101. In some embodiments, the access policies may include some other suitable conditions or criteria that may be used to determine whether a given entity is authorized to request a given blockchain operation.

In accordance with some embodiments, one or more chaincode records 403 may include a reference to one or more access policies, such as the identifier of a given access policy. For example, chaincode records 403-1 and 403-4 may include the identifier of the access policy included in access control record 401-1 (i.e., AC1), and chaincode record 403-2 may include the identifier of the access policy included in access control record 401-2 (i.e., AC2). Chaincode records 403 may also include chaincode, such as a set of operations, functions, etc. to perform on a set of input parameters (e.g., variables, values, references to records of blockchain 101, etc.) in order to generate one or more outputs.

In this manner, access to chaincode records 403-1 and 403-4 (e.g., authorization to invoke chaincode included in, or referenced by, chaincode records 403-1 and 403-4) may be restricted to the access policy specified in access control record 401-1 (e.g., only access group 107-1 is authorized to access chaincode records 403-1 and 403-4). Similarly, access to chaincode record 403-2 may be restricted to the access policy specified in access control record 401-2. In this example, since chaincode record 403-3 does not include a reference to any access policy, access to chaincode record 403-3 may be restricted. For example, chaincode record 403-3 may be accessed by any client device 105 or other suitable entity that has access to blockchain 101, by virtue of not referencing or otherwise being associated with an access policy.

Figure 6:
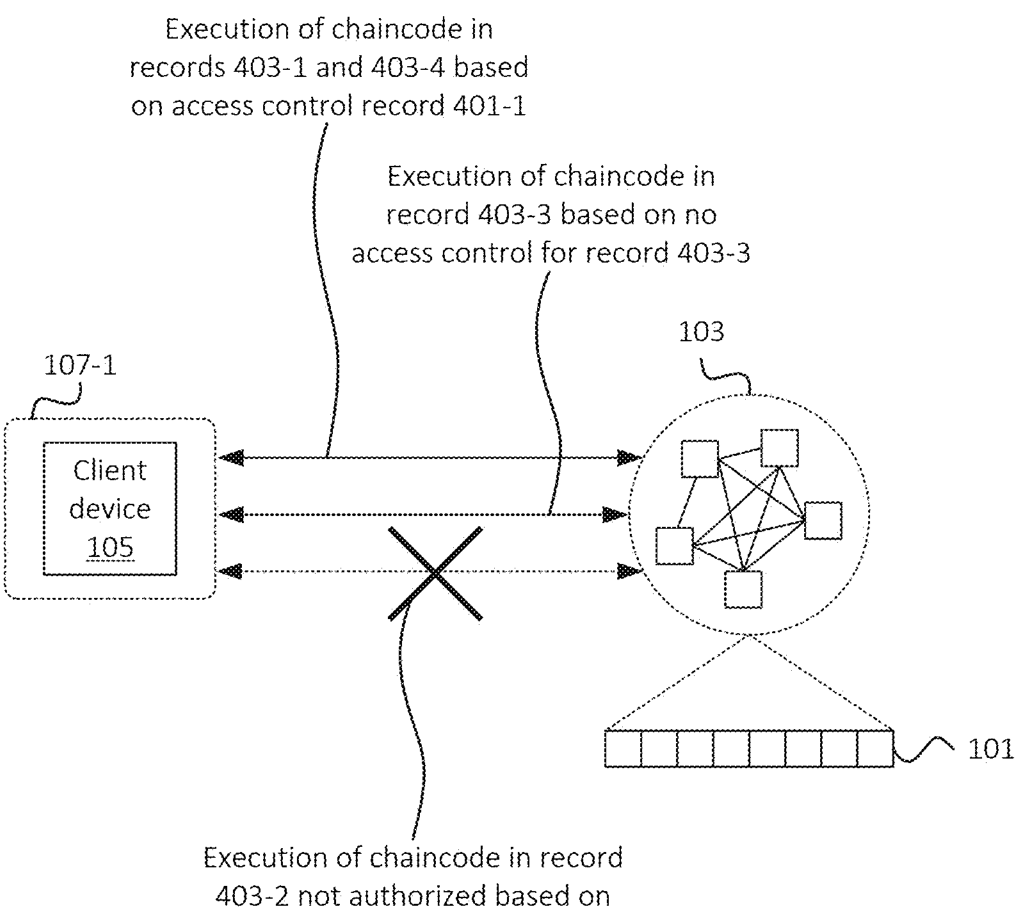

FIG. 6 illustrates an example of a particular client device 105, which is in access group 107-1, selectively being granted or denied access to one or more records of blockchain 101. As noted above, client device 105 may be granted access to invoke, request, etc. chaincode specified in example chaincode records 403-1 and 403-4, based on meeting criteria specified in access control record 401-1 (i.e., where chaincode records 403-1 and 403-4 reference the access policy identifier included in access control record 401-1). Similarly, client device 105 may be granted access to invoke, request, etc. chaincode specified in example chaincode record 403-3, based on chaincode record 403-3 not referencing or including an access policy identifier. On the other hand, client device 105 may be denied access to invoke, request, etc. chaincode specified in example chaincode record 403-2, based on the access policy indicated by chaincode record 403-2 not being met by client device 105.

When requesting access to a given chaincode record 403, client device 105 may, for example, include a device identifier, a client identifier, an address in an address space of blockchain 101, etc. that uniquely identifies client device 105 (e.g., differentiates client device 105 from other client devices). The request to access the given chaincode record 403 may include an identifier of such chaincode record 403, such as a block identifier, an address in an address space of blockchain 101, etc. that uniquely identifies chaincode record 403 (e.g., differentiates chaincode record 403 from other records of blockchain 101).

One or more nodes of blockchain network 103 that receive the request may identify that the specified chaincode record 403 includes a flag, reference, value, etc. that indicates an access policy. For example, prior to executing chaincode included in chaincode record 403, the one or more nodes may identify that chaincode record 403 indicates one or more access policies (e.g., a particular access policy identifier, such as the example identifiers AC1 or AC2). Based on identifying that chaincode record 403 includes an access policy identifier, the one or more nodes may first verify that client device 105 is authorized to access the requested chaincode record 403, prior to executing the operations specified in chaincode record 403 (e.g., chaincode operations) and/or otherwise prior to committing or recording a result of such operations to blockchain 101.

The one or more nodes may accordingly identify the access policy indicated in the corresponding access control record 401. In some embodiments, the access policy may include criteria, such as a device identifier, an address, etc. that the one or more nodes may compare to the information provided by client device 105 when client device 105 issued the request to access chaincode record 403. In some embodiments, the corresponding access control record 401 may itself include chaincode that provides, as output, an indication of whether client device 105 is authorized to access a given chaincode record 403. For example, access control record 401 may specify a device identifier, address, etc. as input. Such access control record 401 may specify operations to perform to determine whether the device identifier, address, etc. meet criteria specified by a given access policy (e.g., whether the device identifier, address, etc. are on an authorized list or otherwise meet such criteria). The output of such chaincode included in access control record 401 may, in some embodiments, include a binary indication (e.g., "authorized" or "not authorized") of whether client device 105 is authorized under the access policy specified in access control record 401.

In this manner, the access policies may be decoupled from the actual records for which access is managed via such access policies. This decoupling may provide for the ability to quickly assign established access policies to new chaincode records 403 that are recorded to blockchain 101. For example, when a new chaincode record 403 is recorded to blockchain 101, the new chaincode record 403 may include a reference to a given access policy that has previously been recorded to blockchain 101 (e.g., in a given access control record 401). Similarly, when a "batch" modification to access parameters for a given set of chaincode records 403 is to be effected, a new access policy with the same access policy identifier may be recorded to blockchain 101, thus superseding previously recorded access control records 401 with the same access policy identifier.

Figure 7:
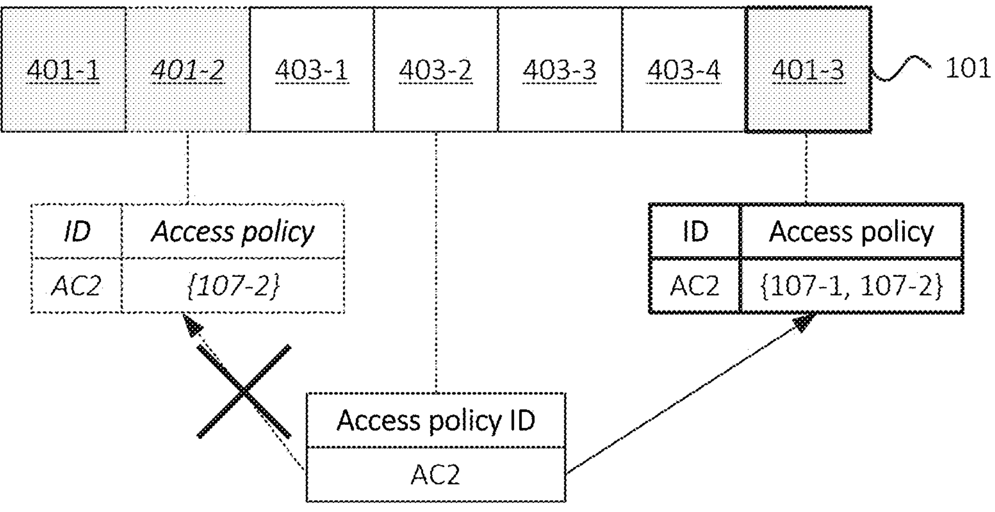
FIG. 7 illustrates an example of updating access control policies for a blockchain via recording a new access control record to the blockchain, in accordance with some embodiments.

For example, as shown in FIG. 7, assume that the access policy with the identifier AC2 is to be updated to include access group 107-1, in addition to access group 107-2. A new access control record 401-3 may be recorded to blockchain 101, which includes the same access policy identifier as access control record 401-2 (e.g., the identifier corresponding to the access policy to be updated). In this manner, a node that receives a request to invoke chaincode included in chaincode record 403-2 may refer to the access policy included in access control record 401-3 rather than the access policy included in access control record 401-2. For example, a world state of blockchain 101 may be updated to include the new access policy, which authorizes access groups 107-1 and 107-2 for the access policy identifier AC2, replacing the previous version of the access policy that previously authorized only access group 107-2. For example, in some embodiments, the most recent (e.g., latest or last recorded) access control record 401 with a given access policy identifier may be used to identify a given access policy for blockchain 101, as older access control records 401 may include outdated access policies.

Figure 8:
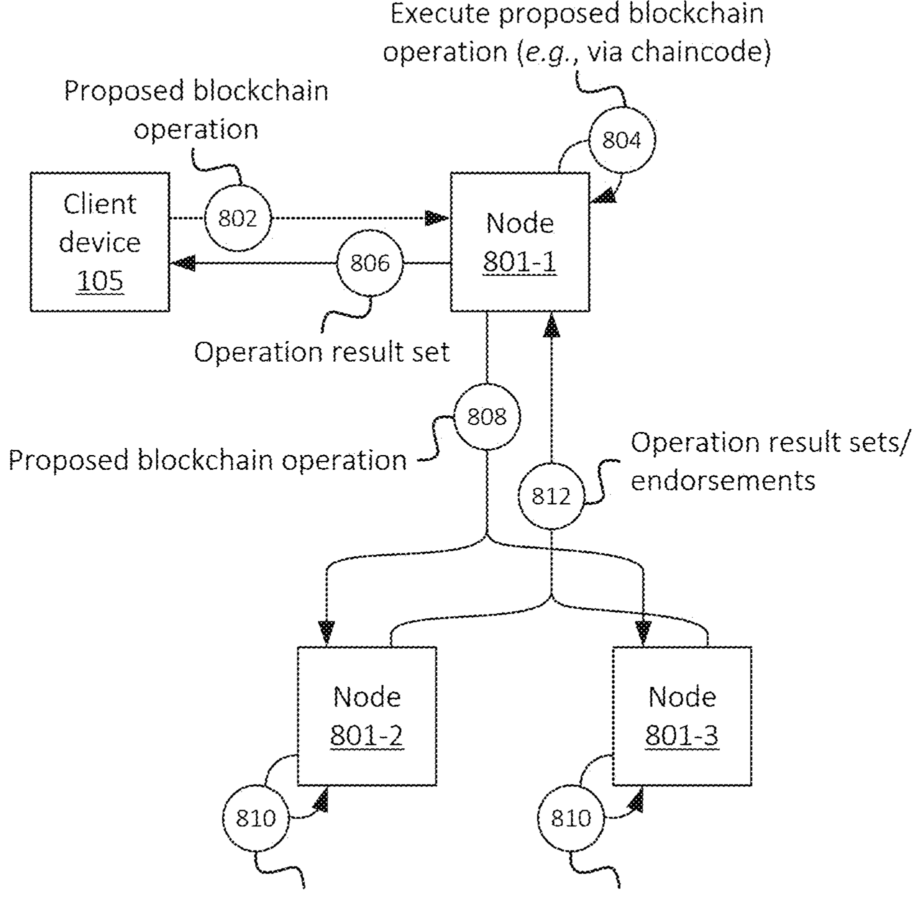
FIGS. 8 and 9 illustrate example operations associated with recording information to a blockchain, in accordance with some embodiments.
Figure 9:
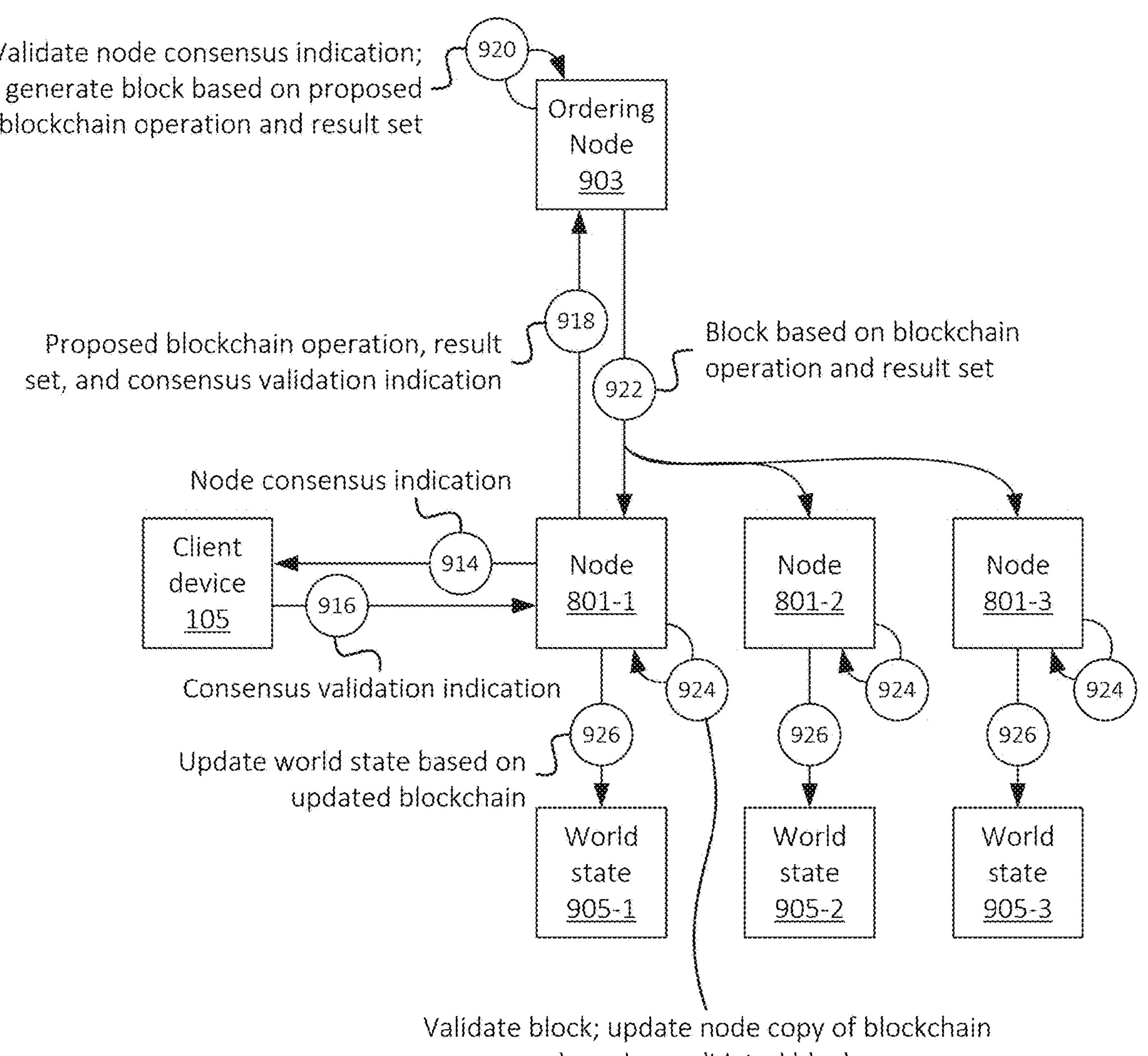

FIGS. 8 and 9 illustrate an example of modifying blockchain 101 and/or world state information based on an interaction with blockchain 101. As shown, a particular node 801-1 may receive (at 802) a proposed blockchain operation (e.g., a request to access or record information to blockchain 101) from a particular source, such as client device 105 (e.g., which may be or may be implemented by a device or system that has access to node 801-1, such as a device or system that has authentication credentials, locator information, etc. via which client device 105 is able to interact with node 801-1). In some embodiments, node 801-1 may receive the proposed blockchain operation from a blockchain management system (e.g., which may receive the proposed blockchain operation from client device 105 and may select node 801-1 out of a group of nodes 801, such as a group of nodes associated with the same channel in a channel-based blockchain system, such as the Hyperledger® Fabric), an ordering node, or other suitable device or system.

Client device 105 may be, for example, an entity associated with blockchain 101 (e.g., may be associated with an address, a "wallet," a decentralized application ("dApp"), etc.). In this example, assume that client device 105 is authorized to initiate, request, etc. the proposed blockchain operation, which may include the modification of one or more values of one or more attributes that are currently associated with blockchain 101, the addition of one or more attributes to blockchain 101, or other suitable interactions. In other examples, node 801-1 and/or some other device or system may verify that client device 105 is authorized to initiate the proposed blockchain operation. For example, determining that client device 105 is authorized to initiate the proposed blockchain operation may include identifying one or more access policies with respect to client device 105 and/or the proposed blockchain operation, as discussed above.

In some embodiments, the proposed blockchain operation (received at 802) may indicate or refer to chaincode recorded to blockchain 101, which may specify one or more inputs (e.g., types of inputs, quantity of inputs, and/or other input parameters), and may also include actions to take with respect to the inputs in order to generate one or more outputs (e.g., chaincode). For example, the proposed blockchain operation may specify particular chaincode (e.g., an address or reference associated with blockchain 101 that includes a record with which the chaincode is associated, a name or identifier of the particular chaincode, or the like) and one or more input values according to input parameters specified by the particular chaincode. In some examples, the proposed blockchain operation may refer to one or more values that have previously been recorded to blockchain 101 (and thus reflected in world state information associated with blockchain 101), such as an interaction that increments or decrements previously recorded values or performs other computations based on previously recorded values.

Node 801-1 may execute (at 804) the proposed blockchain operation, which may include accessing the one or more values that were previously recorded to blockchain 101. In order to determine the one or more values referred to in the proposed blockchain operation, node 801-1 may access world state information, maintained by node 801-1, to determine such values. Such access may include checking a local cache and/or accessing, via a network, a remote system (e.g., a "cloud" system, a containerized system, etc.) associated with node 801-1 that maintains the world state associated with blockchain 101. The execution (at 804) may be a "simulation" of the proposed blockchain operation, inasmuch as the execution and of the proposed blockchain operation and the ensuing result may not yet be recorded to blockchain 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 801-1 may provide (at 806) the result set (e.g., the read-write set) based on executing (at 804) the proposed interaction to client device 105. Client device 105 may maintain the result set to, for example, verify and/or to provide approval of the result set before the result set is committed to blockchain 101. Node 801-1 may also provide (at 808) the proposed blockchain operation to one or more other nodes 801 associated with blockchain 101, such as nodes 801-2 and 801-3. In some embodiments, node 801-1 may provide (at 808) the result set generated by node 801-1 to nodes 801-2 and 801-3. Nodes 801-1 through 801-3 may all be associated with the same channel, nodes 801-2 and 801-3 may be specified by the chaincode as validators, and/or nodes 801-2 and 801-3 may otherwise be identified by node 801-1 or an associated blockchain management system as nodes that should validate, endorse, etc. the execution and result of the proposed interaction.

As similarly discussed with respect to node 801-1, nodes 801-2 and 801-3 may execute (at 810), and/or simulate the execution of, the proposed interaction. Accordingly, nodes 801-2 and 801-3 may access one or more values that were previously recorded to blockchain 101 using world state information maintained by nodes 801-2 and 801-3. Nodes 801-2 and 801-3 may validate, verify, etc. the result set generated by node 801-1 by comparing the result set with respective result sets generated by nodes 801-2 and 801-3. Nodes 801-2 and 801-3 may respond (at 812) to node 801-1 with respective result sets generated by nodes 801-2 and 801-3, and/or may respond with an indication, endorsement, etc. (e.g., which may be respectively signed by nodes 801-2 and 801-3) that the result set generated by node 801-1 is valid. Once node 801-1 has received endorsements from at least a threshold quantity of other nodes (e.g., from nodes 801-2 and 801-3, in this example), node 801-1 may determine that a consensus has been reached with respect to the result set for the proposed interaction.

As shown in FIG. 9, node 801-1 may accordingly provide (at 914), to client device 105, an indication that consensus for the result set (provided at 806) has been reached. In some embodiments, client device 105 may validate the consensus (e.g., by evaluating signatures of nodes 801-2 and 801-3) and/or may verify the result set (e.g., by itself executing the proposed interaction). Client device 105 may provide (at 916), to node 801-1, an indication that client device 105 has validated the consensus and/or has verified the result set. In some embodiments, the consensus validation indication may be signed by client device 105, thus securely authenticating the validation by client device 105.

Node 801-1 may provide (at 918) the result set, along with the consensus validation indication and the proposed blockchain operation, to ordering node 903. Ordering node 903 may be a node, associated with the same channel as nodes 801-1 through 801-3, that validates (at 920) the consensus validation indication (e.g., validates signatures associated with client device 105 and/or nodes 801-1 through 801-3) and generates a block, to be recorded to blockchain 101, that includes information regarding the blockchain operation. Such information may include an identifier of client device 105 (e.g., an address, wallet identifier, etc.), identifiers of nodes 801-1 through 801-3 that participated in generating and/or validating the result set based on the blockchain operation, chaincode inputs provided by client device 105, the consensus validation indication, one or more timestamps of the above operations and/or other events, and/or other suitable information associated with the blockchain operation. In some embodiments, the block may be signed by ordering node 903, thus securely authenticating the block creation by ordering node 903. At this point, the blockchain operation may no longer be a "proposed" blockchain operation, as the interaction has been finalized, committed, etc. by ordering node 903. In some implementations, nodes 801-1 through 801-3 may be referred to as "peers," to indicate that such nodes 801-1 through 801-3 are distinct from ordering node 903 (e.g., ordering node 903 performs one or more different operations from the peers).

Ordering node 903 may propagate (at 922) the signed block, including information regarding the finalized blockchain operation initiated by client device 105, to nodes 801-1 through 801-3 and/or other nodes associated with the same channel. Nodes 801-1 through 801-3 may validate (at 924) the block, which may include verifying the signature of ordering node 903, and may accordingly update a respective copy of blockchain 101 as maintained by each one of nodes 801-1 through 801-3. Nodes 801-1 through 801-3 may maintain respective independent copies of blockchain 101, thus providing an element of decentralization to blockchain 101. As such, when adding the block (received at 922), nodes 801-1 through 801-3 may continue to maintain separate copies of the same blockchain 101, including the information regarding the finalized blockchain operation.

Nodes 801-1 through 801-3 may also maintain respective world state information 905 (e.g., world state information 905-1, 905-2, and 905-3). For example, world state information 905 may include a portion of the information stored in blockchain 101, such as the latest version of some or all of the attributes for which information has been recorded to blockchain 101. Nodes 801-1 through 801-3 may accordingly update (at 926) respective copies of world state information 905 based on the received block. For example, in the event that the block includes a change in the value of a particular attribute, nodes 801-1 through 801-3 may update world state information 905-1 through 905-3, respectively, to replace a previous value of the attribute (e.g., a previous version of the attribute) with the newly received value of the particular attribute.

Figure 10:
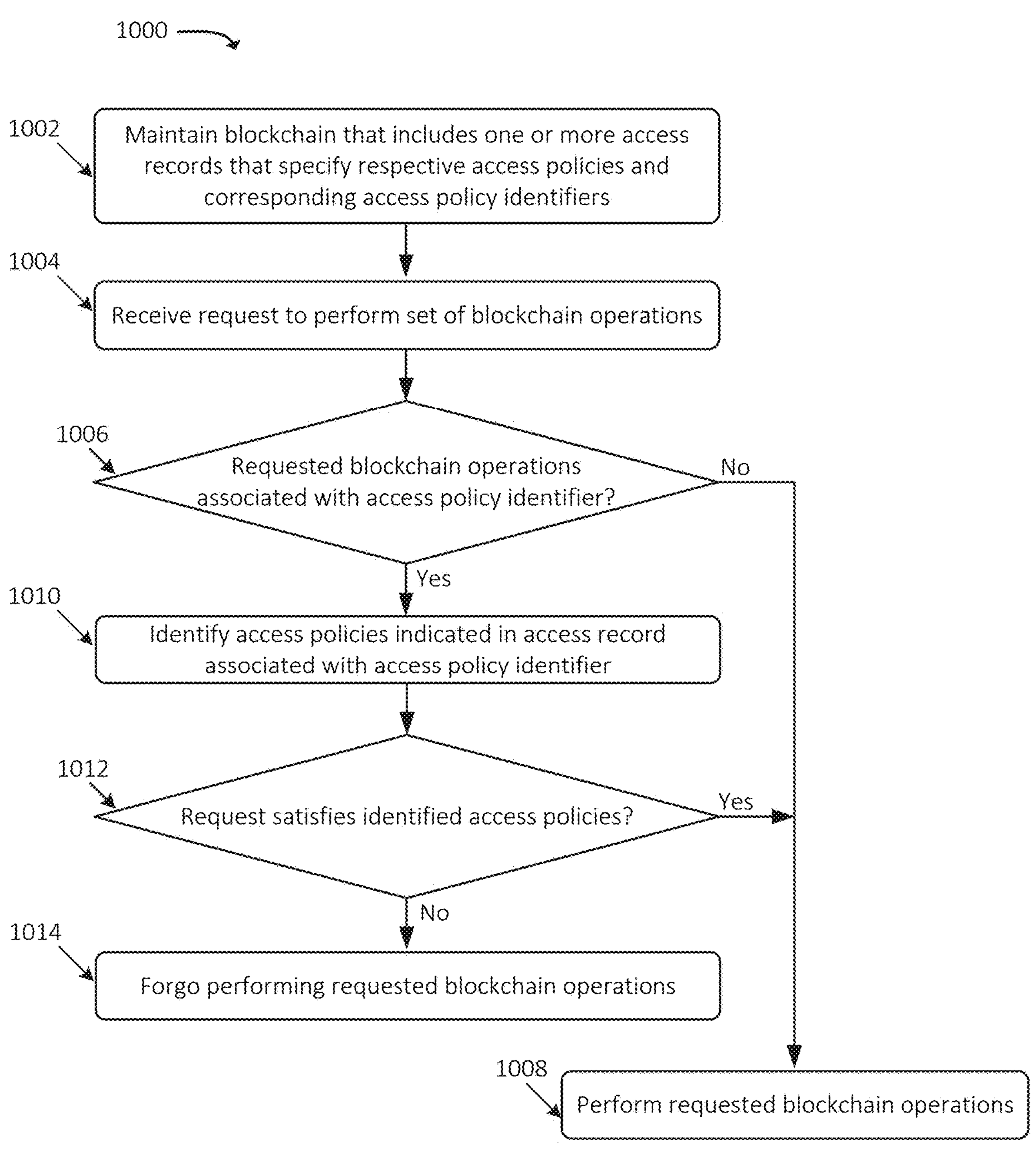
FIG. 10 illustrates an example process for providing selective access to portions of a blockchain, in accordance with some embodiments.

FIG. 10 illustrates an example process 1000 for providing selective access to portions of a blockchain. In some embodiments, some or all of process 1000 may be performed by one or more nodes 801. In some embodiments, one or more other devices may perform some or all of process 1000 in concert with, and/or in lieu of, one or more nodes 801.

As shown, process 1000 may include maintaining (at 1002) a blockchain that includes one or more access records that specify respective access policies and corresponding access policy identifiers. For example, as discussed above, blockchain 101 may include one or more access control records 401 that include unique access policy identifiers for respective access policies. As discussed above, access policies may include criteria, conditions, etc. that may be used to ultimately determine whether to grant or deny requests to perform blockchain operations (e.g., invoking chaincode that uses data recorded to blockchain 101 as inputs, recording new blocks to blockchain 101, etc.). Such criteria, conditions, etc. may include one or more device or client identifiers and/or other types of criteria, such as device type, time of day, and/or other suitable criteria or conditions.

Process 1000 may further include receiving (at 1004) a request to perform a particular set of blockchain operations. For example, node 801 may receive the request from a particular client device 105. The requested set of blockchain operations may, in some implementations, include chaincode. As discussed above, chaincode may specify one or more input parameters (e.g., types of input parameters, quantities of input parameters, etc.), as well as operations to perform on such input parameters. In some embodiments, the chaincode may also specify output parameters that may be generated as a result of executing the operations on the input parameters. In some instances, the request may include references to information that has been previously recorded to blockchain 101 (e.g., may include block identifiers, variable names that relate to variables that are stored in one or more blocks of blockchain 101, etc.). In this sense, different sets of chaincode, for which different access groups 107 are authorized, may make use of information recorded to blockchain 101 (e.g., shared records, as discussed above), without requiring that such information be duplicated on different blockchains 101 or channels that have different access parameters.

Process 1000 may additionally include determining (at 1006) whether the requested blockchain operations are associated with an access policy identifier. As discussed above, particular sets of blockchain operations (e.g., particular sets of chaincode) may include a flag, metadata, or the like that includes a particular access policy identifier. For example, a particular set of operations, for which access is to be granted to a particular access group 107, may include an access policy identifier that is included in a particular access control record 401 that corresponds to a particular access policy that indicates authorization for the particular access group 107. As discussed above, for example, a particular chaincode record 403 may include chaincode (e.g., a set of blockchain operations) as well as an access policy identifier. On the other hand, chaincode that is "open" or "not restricted" (e.g., accessible to any client device 105 that has access to blockchain 101) may not include an access policy identifier (and/or may include an access policy identifier that indicates "open" or "not restricted" access). As also noted above, in some situations, the chaincode may be implemented via an API, SDK, blockchain framework, etc. implemented by node 801 (e.g., may be independent of and/or may not be recorded to blockchain 101).

If the requested blockchain operations are not associated with an access policy identifier (at 1006—NO), then process 1000 may proceed to performing (at 1008) the requested blockchain operations. For example, if the requested blockchain operations (e.g., chaincode) do not indicated restricted access (e.g., by virtue of not being associated with any access policy identifier), then node 801 may proceed to perform the requested blockchain operations (e.g., as discussed above with respect to operations 804-926).

If, on the other hand, the requested blockchain operations are associated with an access policy identifier (at 1006—YES), then process 1000 may proceed to identifying (at 1010) access policies indicated in an access record associated with the access policy identifier. For example, node 801 may identify a particular access control record 401 that includes the access policy identifier. As discussed above, identifying the particular access control record 401 may include identifying the most recent access control record 401 that includes the access policy identifier, in situations where multiple access control records 401 include the same access policy identifier. In some embodiments, node 801 may identify some other access control record 401 that includes the access policy identifier, other than the most recent access control record 401 (e.g., in implementations where the most recently recorded access control record 401 may not necessarily be the "correct" or "valid" access control record 401 for the given access policy identifier). Node 801 may further identify the corresponding access policies associated with the access policy identifier (e.g., as included in or indicated by the identified access control record 401).

Process 1000 may additionally include determining (at 1012) whether the request satisfies the identified access policies. For example, as noted above, node 801 may compare attributes of the request or the requestor (e.g., an identifier, device type, etc. of client device 105) to the conditions, criteria, etc. indicated in the identified access policies. In some embodiments, the request may include one or more authentication tokens, keys, cryptographic hashes, or the like, and the access policies may include or indicate cryptographic authentication mechanisms to implement using such tokens, keys, etc. in order to verify authentication and/or authorization of client device 105 in accordance with the access policies. As discussed above, in some embodiments, the access policies themselves may include or indicate chaincode to execute in order to determine whether the request is authorized. In some embodiments, node 801 may determine whether the request satisfies the identified access policies using some other suitable mechanism or procedure.

If the request satisfies the identified access policies (at 1012—YES), then process 1000 may proceed to performing (at 1008) the requested blockchain operations. For example, if client device 105 is authorized in accordance with the access policies associated with the access policy identifier indicated by the requested set of operations (e.g., included as a flag or reference in requested chaincode), then node 801 may proceed with initiating the requested operations with respect to blockchain 101, as discussed above.

If, on the other hand, the request does not satisfy the identified access policies (at 1012—NO), then process 1000 may proceed to forgoing performing (at 1014) the requested blockchain operations. For example, node 801 may reject the request, without performing the requested blockchain operations (e.g., chaincode). Additionally, or alternatively, rejecting the request may include performing the requested blockchain operations, but without ultimately causing a result of the requested blockchain operations to be recorded, committed, etc. to blockchain 101.

Figure 11:
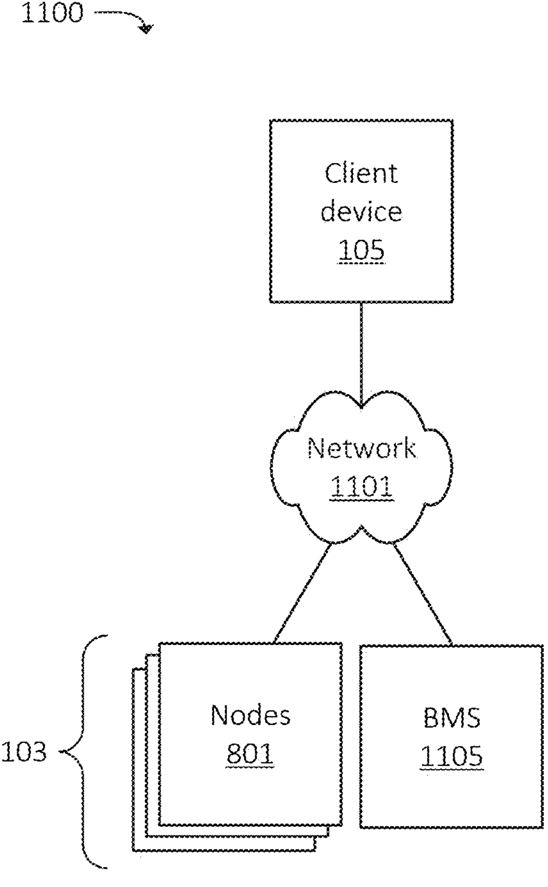
FIG. 11 illustrates an example environment in which one or more embodiments, described herein, may be implemented.

FIG. 11 illustrates an example environment 1100, in which one or more embodiments may be implemented. Environment 1100 may include network 1101, client device 105, Blockchain Management System ("BMS") 1105, and nodes 801. In some embodiments, environment 1100 may include one or more additional devices or systems communicatively coupled to network 1101 and/or one or more other networks.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. In some implementations, one or more devices of environment 1100 may be physically integrated in, and/or may be physically attached to, one or more other devices of environment 1100. Alternatively, or additionally, one or more of the devices of environment 1100 may perform one or more network functions described as being performed by another one or more of the devices of environment 1100. Elements of environment 1100 may interconnect with each other and/or other devices via wired connections, wireless connections, or a combination of wired and wireless connections. Some or all of the elements of environment 1100 may be implemented by one or more devices, sets of hardware resources, cloud systems, or the like.

Network 1101 may include one or more wired and/or wireless networks. For example, network 1101 may include an IP-based Packet Data Network ("PDN"), a wide area network ("WAN") such as the Internet, a private enterprise network, and/or one or more other networks. Client device 105, BMS 1105, nodes 801, and/or other devices or systems may communicate, through network 1101, with each other and/or with other devices that are coupled to network 1101. Network 1101 may be connected to one or more other networks, such as a public switched telephone network ("PSTN"), a public land mobile network ("PLMN"), and/or another network. Network 1101 may be connected to one or more devices, such as content providers, applications, web servers, and/or other devices, with which client device 105, BMS 1105, nodes 801, and/or other devices or systems may communicate.

Client device 105, BMS 1105, nodes 801, and/or other devices or systems may be implemented by one or more cloud systems, server devices, or other types of hardware resources. In some embodiments, client device 105, BMS 1105, and/or nodes 801 may be implemented by or communicatively coupled to a User Equipment ("UE"), which may include a computation and communication device, such as a wireless mobile communication device that is capable of communicating with network 1101. The UE may communicate with network 1101 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 12:
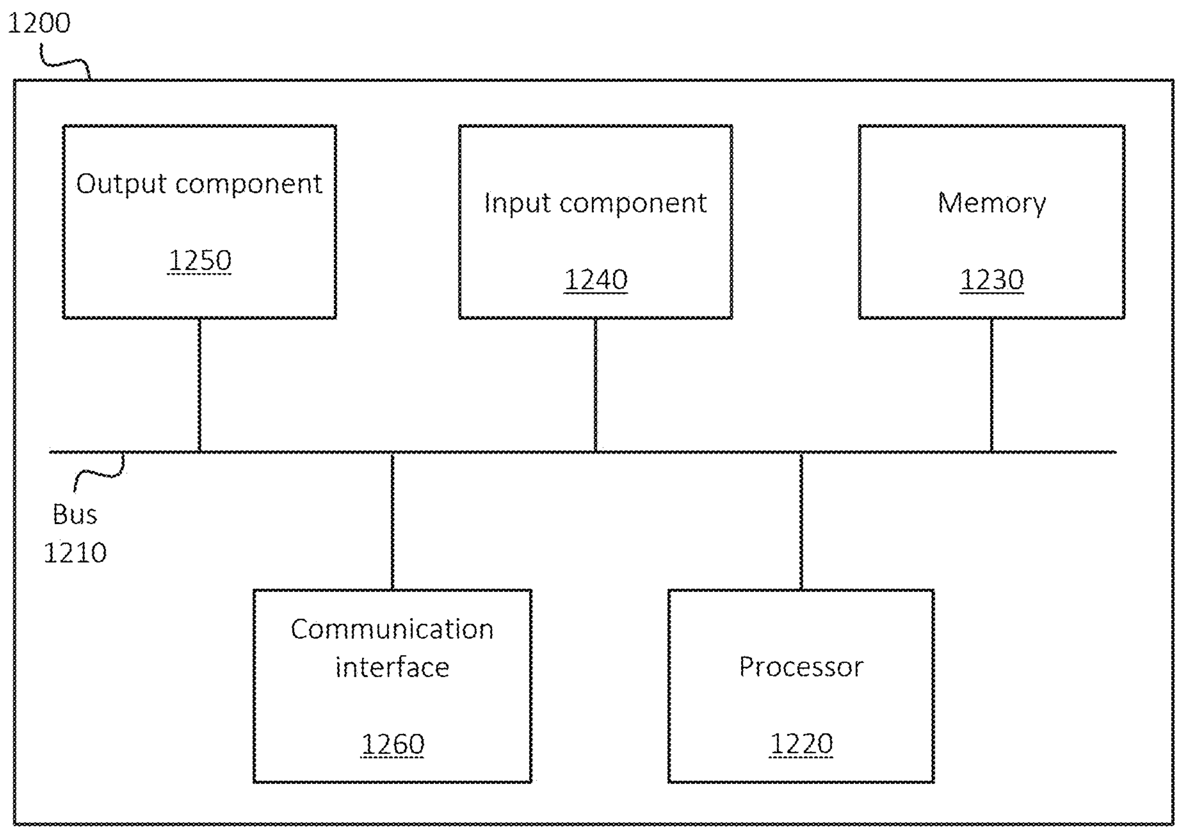
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, a set of provisioned hardware resources of a cloud computing system, or other suitable type of hardware that interprets and/or executes instructions (e.g., processor-executable instructions). In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems (e.g., via a RAN, a wired network, the Internet, etc.). For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1200 may include more than one communication interface 1260. For instance, device 1200 may include an optical interface, a wireless interface, an Ethernet interface, and/or one or more other interfaces.

Device 1200 may perform certain operations relating to one or more processes described above. Device 1200 may perform these operations in response to processor 1220 executing instructions, such as software instructions, processor-executable instructions, etc. stored in a computer-readable medium, such as memory 1230. A computer-readable medium may be defined as a non-transitory memory device. A memory device may include space within a single physical memory device or spread across multiple physical memory devices. The instructions may be read into memory 1230 from another computer-readable medium or from another device. The instructions stored in memory 1230 may be processor-executable instructions that cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more hardware processors configured to:

maintain a blockchain that includes a plurality of records, wherein a first record of the blockchain includes:

a first set of access policies, and an access policy identifier, wherein a second record of the blockchain includes:

a second set of access policies, and the access policy identifier;

receive a request to perform a set of operations with respect to the blockchain;

determine that the requested set of operations is associated with the access policy identifier;

determine, based on identifying that the requested set of operations is associated with the access policy identifier, whether the request meets the first set of access policies included in the first record with which the access policy identifier is associated, wherein determining that the request meets the first set of access policies includes determining that the second record was recorded to the blockchain prior to the first record; and selectively perform or forgo performing the requested set of operations based on the determination of whether the request meets the first set of access policies, wherein the selectively performing or forgoing performing includes:

performing, when determining that the request meets the first set of access policies, the requested set of operations; and forgoing performing, when determining that the request does not meet the first set of access policies, the requested set of operations.

2. The device of claim 1, wherein the set of operations with respect to the blockchain includes chaincode that further specifies a set of input parameters, wherein the request to perform the set of operations includes particular input parameters that are based on the specified set of input parameters.

3. The device of claim 2, wherein the chaincode is maintained in one or more records of the blockchain.

4. The device of claim 1, wherein the first set of access policies specifies a set of criteria, wherein determining whether the request meets the first set of access policies includes determining whether one or more attributes of the request satisfy the set of criteria specified by the first set of access policies.

5. The device of claim 1, wherein determining that the request meets the first set of access policies further includes determining that the first set of access policies is a most recent set of access policies associated with the access policy identifier.

6. A device, comprising:

one or more hardware processors configured to:

maintain a blockchain that includes a plurality of records, wherein a particular record of the blockchain includes:

a first set of access policies that specifies a first access group, and an access policy identifier;

receive a request to perform a first set of operations with respect to the blockchain;

determine that the requested first set of operations is associated with the access policy identifier;

determine, based on identifying that the requested first set of operations is associated with the access policy identifier, whether the request meets the first set of access policies included in the particular record with which the access policy identifier is associated;

selectively perform or forgo performing the requested first set of operations based on the determination of whether the request meets the first set of access policies, wherein the selectively performing or forgoing performing includes:

performing, when determining that the request meets the first set of access policies, the requested first set of operations; and forgoing performing, when determining that the request does not meet the first set of access policies, the requested first set of operations; and maintain or identify a second set of operations that are associated with a second set of access policies that specifies a second access group that is different from the first access group, wherein the first access group is authorized, based on the first set of access policies, to invoke the first set of operations, using one or more records of the plurality of records as input for the first set of operations, wherein the second access group is not authorized to invoke the first set of operations based on the first set of access policies, wherein the second access group is authorized, based on the second set of access policies, to invoke the second set of operations, using the one or more records of the plurality of records as input for the second set of operations, and wherein the first access group is not authorized to invoke the second set of operations based on the second set of access policies.

7. The device of claim 6, wherein the first set of operations with respect to the blockchain includes chaincode that further specifies a set of input parameters, wherein the request to perform the first set of operations includes particular input parameters that are based on the specified set of input parameters.

8. The device of claim 7, wherein the chaincode is maintained in one or more records of the blockchain.

9. The device of claim 6, wherein the first set of access policies specifies a set of criteria, wherein determining whether the request meets the first set of access policies includes determining whether one or more attributes of the request satisfy the set of criteria specified by the first set of access policies.

10. A non-transitory computer-readable medium, storing a plurality of processor-executable instructions to:

maintain a blockchain that includes a plurality of records, wherein a first record of the blockchain includes:

a first set of access policies, and an access policy identifier, wherein a second record of the blockchain includes:

a second set of access policies, and the access policy identifier;

receive a request to perform a set of operations with respect to the blockchain;

determine that the requested set of operations is associated with the access policy identifier;

determine, based on identifying that the requested set of operations is associated with the access policy identifier, whether the request meets the first set of access policies included in the first record with which the access policy identifier is associated, wherein determining that the request meets the first set of access policies includes determining that the second record was recorded to the blockchain prior to the first record; and selectively perform or forgo performing the requested set of operations based on the determination of whether the request meets the first set of access policies, wherein the selectively performing or forgoing performing includes:

performing, when determining that the request meets the first set of access policies, the requested set of operations; and forgoing performing, when determining that the request does not meet the first set of access policies, the requested set of operations.

11. The non-transitory computer-readable medium of claim 10, wherein the set of operations with respect to the blockchain includes chaincode that further specifies a set of input parameters, wherein the request to perform the set of operations includes particular input parameters that are based on the specified set of input parameters.

12. The non-transitory computer-readable medium of claim 11, wherein the chaincode is maintained in one or more records of the blockchain.

13. The non-transitory computer-readable medium of claim 10, wherein the first set of access policies specifies a set of criteria, wherein determining whether the request meets the first set of access policies includes determining whether one or more attributes of the request satisfy the set of criteria specified by the first set of access policies.

14. The non-transitory computer-readable medium of claim 10, wherein the set of operations is a first set of operations, wherein the set of access policies is a first set of access policies that specifies a first access group, wherein the processor-executable instructions further include processor-executable instructions to:

maintain or identify a second set of operations that are associated with a second set of access policies that specifies a second access group that is different from the first access group, wherein the second access group is not authorized to invoke the first set of operations based on the first set of access policies, and wherein the first access group is not authorized to invoke the second set of operations based on the second set of access policies.

15. The non-transitory computer-readable medium of claim 14, wherein the first access group is authorized, based on the first set of access policies, to invoke the first set of operations, using one or more records of the plurality of records as input for the first set of operations, and wherein the second access group is authorized, based on the second set of access policies, to invoke the second set of operations, using the one or more records of the plurality of records as input for the second set of operations.

16. A method, comprising:

maintaining a blockchain that includes a plurality of records, wherein a particular record of the blockchain includes:

a first set of access policies that specifies a first access group, and an access policy identifier;

receiving a request to perform a first set of operations with respect to the blockchain;

determining that the requested first set of operations is associated with the access policy identifier;

determining, based on identifying that the requested first set of operations is associated with the access policy identifier, whether the request meets the first set of access policies included in the particular record with which the access policy identifier is associated;

selectively performing or forgoing performing the requested first set of operations based on the determination of whether the request meets the first set of access policies, wherein the selectively performing or forgoing performing includes:

performing, when determining that the request meets the first set of access policies, the requested first set of operations; and forgoing performing, when determining that the request does not meet the first set of access policies, the requested first set of operations; and maintaining or identifying a second set of operations that are associated with a second set of access policies that specifies a second access group that is different from the first access group, wherein the first access group is authorized, based on the first set of access policies, to invoke the first set of operations, using one or more records of the plurality of records as input for the first set of operations, wherein the second access group is not authorized to invoke the first set of operations based on the first set of access policies, wherein the second access group is authorized, based on the second set of access policies, to invoke the second set of operations, using the one or more records of the plurality of records as input for the second set of operations, and wherein the first access group is not authorized to invoke the second set of operations based on the second set of access policies.

17. The method of claim 16, wherein the first set of operations with respect to the blockchain includes chaincode that further specifies a set of input parameters, wherein the request to perform the first set of operations includes particular input parameters that are based on the specified set of input parameters.

18. The method of claim 16, wherein the first set of access policies specifies a set of criteria, wherein determining whether the request meets the first set of access policies includes determining whether one or more attributes of the request satisfy the set of criteria specified by the first set of access policies.

19. The method of claim 16, wherein the blockchain further includes a second record that includes the access policy identifier and a different second set of access policies, wherein determining that the request meets the first set of access policies includes determining that the second record was recorded to the blockchain prior to the first record.

20. The method of claim 19, wherein determining that the request meets the first set of access policies further includes determining that the first set of access policies is a most recent set of access policies associated with the access policy identifier.

* * * * *